(12) United States Patent
Potticary et al.

(10) Patent No.: US 10,124,852 B2
(45) Date of Patent: Nov. 13, 2018

(54) INTERNAL VEHICLE DOCKING ARM AND STORAGE

(71) Applicant: Ford Global Technologies, LLC, Dearborn, MI (US)

(72) Inventors: Simon Potticary, Basildon (GB); Richard Craven, Chelmsford (GB); James Neugebauer, Chelmsford (GB); Bruce Southey, Farnham (GB); Jonathan Mundy, Brentwood (GB); James Lloyd, Rochford (GB); Andrew John Murray, Colchester (GB)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 646 days.

(21) Appl. No.: 14/337,283

(22) Filed: Jul. 22, 2014

(65) Prior Publication Data

US 2016/0023586 A1    Jan. 28, 2016

(51) Int. Cl.
| | | |
|---|---|---|
| *B62K 15/00* | (2006.01) |
| *B60R 11/00* | (2006.01) |
| *B60P 1/54* | (2006.01) |
| *B60R 9/10* | (2006.01) |
| *B60R 5/04* | (2006.01) |
| *B60R 9/06* | (2006.01) |
| *B62H 3/00* | (2006.01) |

(52) U.S. Cl.
CPC ............ *B62K 15/006* (2013.01); *B60P 1/548* (2013.01); *B60R 9/10* (2013.01); *B60R 11/00* (2013.01); *B60R 5/04* (2013.01); *B60R 9/06* (2013.01); *B60R 2011/008* (2013.01); *B60R 2011/0036* (2013.01); *B62H 3/00* (2013.01)

(58) Field of Classification Search
CPC ..... B60P 1/5423; B60P 1/5428; B60P 1/5433; B60P 1/5471; B60P 1/5476; B60P 1/548; B60P 1/5485; B60P 1/549; B60P 1/5495; B60R 9/0426; B60R 9/10; B60R 11/00; B60R 2011/0036; B60R 2011/0082; B60R 2011/0085; B62M 6/40
USPC .......................................... 414/462, 465, 466
See application file for complete search history.

(56) References Cited

U.S. PATENT DOCUMENTS

| | | | |
|---|---|---|---|
| 3,627,158 A | | 12/1971 | Kobasic |
| 4,406,574 A | * | 9/1983 | Riley ...................... B66C 23/44 |
| | | | 212/180 |

(Continued)

FOREIGN PATENT DOCUMENTS

| | | |
|---|---|---|
| CA | 2739693 A1 | 11/2012 |
| CN | 2825435 Y | 10/2006 |

(Continued)

OTHER PUBLICATIONS

GB Search Report dated Jan. 18, 2016 (4 pages).

*Primary Examiner* — Saul Rodriguez
*Assistant Examiner* — Brendan P Tighe
(74) *Attorney, Agent, or Firm* — Frank A. MacKenzie; Bejin Bieneman PLC

(57) ABSTRACT

A lift assembly for a vehicle includes a bracket configured to be fixed to the vehicle. A lift arm is pivotally coupled to the bracket. A mating structure is supported by the lift arm. The mating structure is configured to lift a personal mobility device and includes an electrical connector for electrically mating to an electrical connector of the personal mobility device.

19 Claims, 7 Drawing Sheets

(56) References Cited

U.S. PATENT DOCUMENTS

| | | | |
|---|---|---|---|
| 4,565,482 | A | 1/1986 | Baker |
| 4,573,854 | A | 3/1986 | McFarland |
| 4,671,726 | A | 6/1987 | McFarland |
| 5,096,361 | A | 3/1992 | Crawford |
| 5,746,563 | A | 5/1998 | Steckler |
| 6,416,272 | B1 | 7/2002 | Suehiro et al. |
| 6,638,000 | B2 * | 10/2003 | Groves .................. B60R 9/042 224/321 |
| 6,979,013 | B2 | 12/2005 | Chen |
| 7,377,740 | B2 * | 5/2008 | Panzarella ............ B60P 1/5433 212/180 |
| 7,458,760 | B1 * | 12/2008 | Panzarella ............ B60P 1/5433 212/180 |
| 7,717,663 | B1 * | 5/2010 | Stowers ................ B60P 1/5433 414/550 |
| 8,186,930 | B2 * | 5/2012 | Gaghis ................ A61G 3/0808 414/462 |

FOREIGN PATENT DOCUMENTS

| | | | |
|---|---|---|---|
| EP | 0563892 | A1 | 10/1993 |
| EP | 2176117 | B1 | 3/2011 |
| JP | 08308022 | A * | 11/1996 |
| JP | 2015024805 | A | 2/2015 |

* cited by examiner

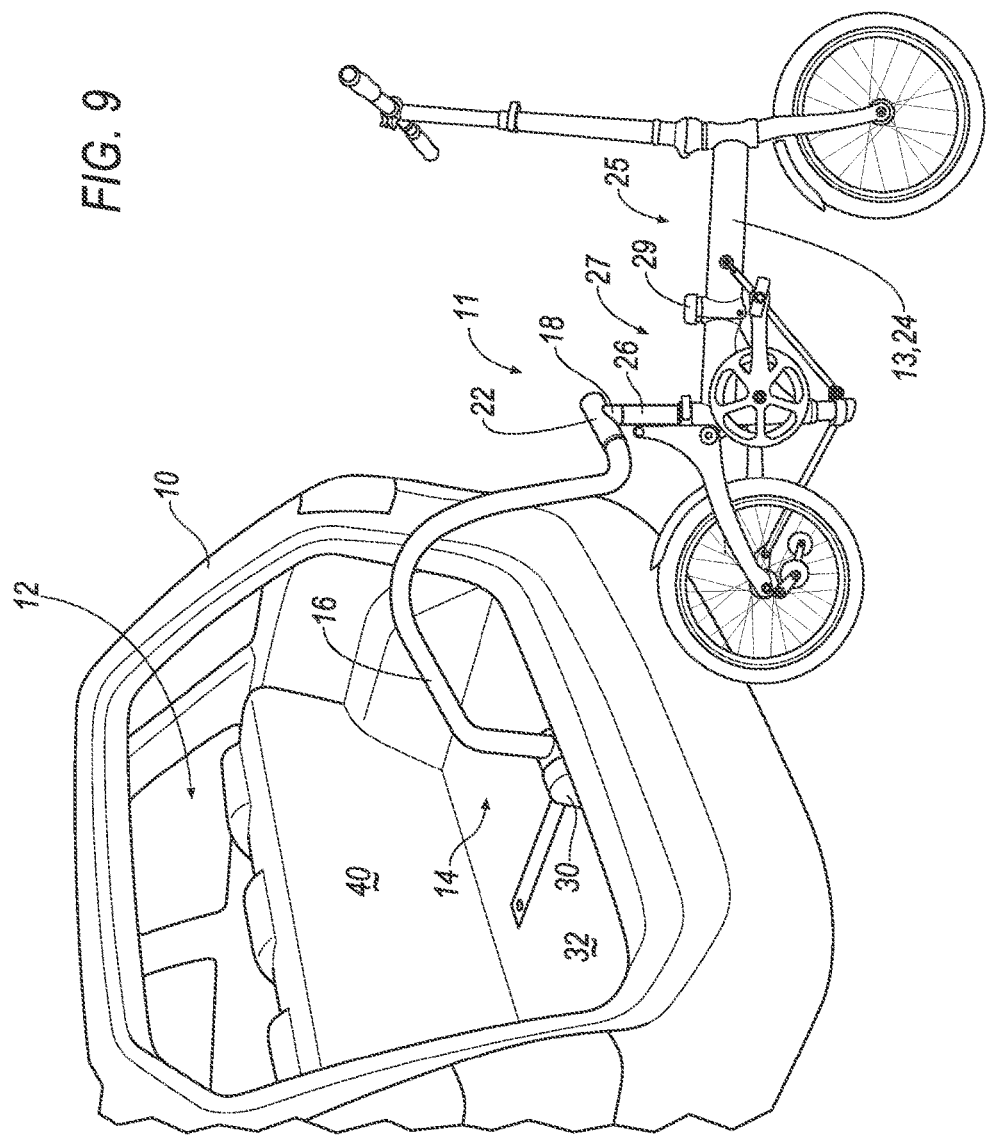

INTERNAL VEHICLE DOCKING ARM AND STORAGE

BACKGROUND

Personal mobility devices, such as bicycles, are often transported with vehicles for use at various destinations. Packaging personal mobility devices in or on a vehicle during transportation creates difficulties, especially with relatively small vehicles. An interior of a vehicle may be reconfigurable, e.g., seats may be folded, to accommodate a personal mobility device in the interior of the vehicle. However, the personal mobility devices disadvantageously consumes valuable interior space of the vehicle and can disadvantageously move within the vehicle during unexpected acceleration or deceleration.

Personal mobility devices can alternatively be stored on an exterior of a vehicle during transportation. For example, after-market racks are available for mounting to vehicles and supporting one or more personal mobility devices, e.g., bicycle racks. However, assembly of the after-market rack to the vehicle and assembly of the personal mobility device onto the rack is also disadvantageously physically strenuous and time consuming. Further, these after-market racks are expensive to purchase and disrupt airflow around the vehicle during travel, thereby disadvantageously decreasing fuel economy of the vehicle. Accordingly, there remains an opportunity to design a system that easily and compactly stores personal mobility devices.

BRIEF DESCRIPTION OF THE DRAWINGS

FIG. 9 is a perspective view of the vehicle, personal mobility device, and lift arm with the lift arm supporting the personal mobility device in an unfolded position.

DETAILED DESCRIPTION

Figure 1:
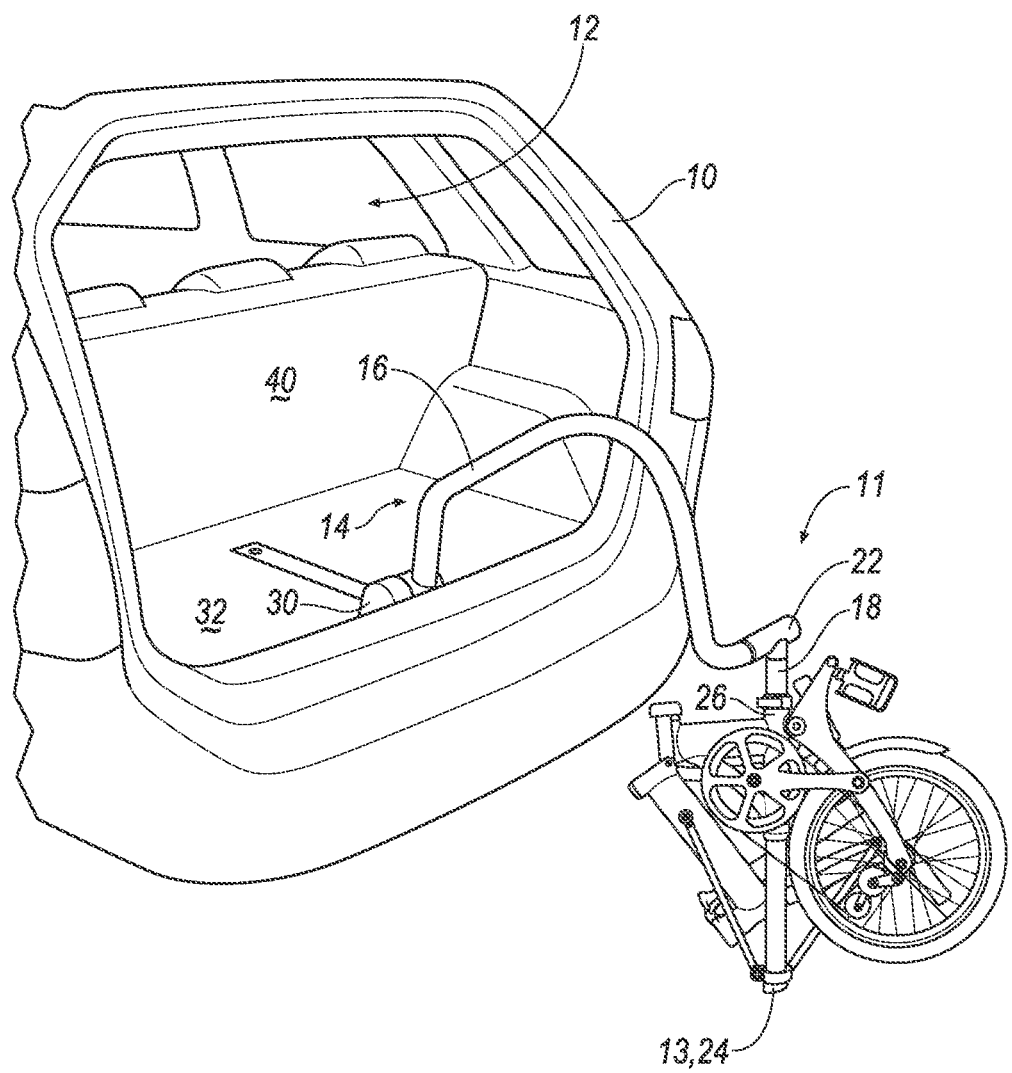
FIG. 1 is a perspective view of a vehicle, a personal mobility device, and a lift assembly engaged with the personal mobility device.

With reference to the Figures, wherein like numerals indicate like parts throughout the several views, a vehicle 10 including a personal mobility system 11 is generally shown. The personal mobility system 11 includes a personal mobility device 13 that may be removed from the vehicle 10 and driven away from the vehicle 10. The vehicle 10 includes an interior 12 and the personal mobility system 13 includes a lift assembly 14 mounted in the interior 12 of the vehicle 10. The lift assembly 14 may assist in loading, unloading, and stowing the personal mobility device 13 in the interior 12 of the vehicle 10.

The lift assembly 14 includes a mating structure 18 configured to both lift the personal mobility device 13 and electrically mate to the personal mobility device 13. As such, the lift assembly 14 may be used to lift the personal mobility device 13 into the vehicle 10 for storage and transportation of the personal mobility device 13. The lift assembly 14 may remain mated with the personal mobility device 13 when the personal mobility device is stowed in the vehicle 10. Simultaneously, during lifting and/or storage of the personal mobility device 13, the lift assembly 14 may also charge the personal mobility device 13, as set forth further below.

The personal mobility device 13 may be, for example an electric bicycle 24, as shown in the Figures. In such an embodiment, the electric bicycle 24 may be foldable, as shown in the Figures. The electric bicycle 24 of the Figures is foldable, for example, in a similar fashion as the non-electric bicycle commercially available from Dahon North America Inc. under the tradename Jifo. However, the electric bike 24 may be foldable in any suitable way. As best shown in FIG. 9, in the configuration where the electric bicycle 24 is foldable, the electric bicycle 24 may include a front portion 25 and a rear portion 27 that are foldable about a pivot point 29. The electric bicycle 24 is shown unfolded in FIG. 9 and is shown folded in FIGS. 1-4 and 6-8. In the alternative to the electric bicycle 24, the personal mobility device 13 may be any suitable type such as, for example, a wheelchair, a motorized scooter, etc.

As set forth above, the personal mobility device 13 may be electrically powered. For example, the personal mobility device 13 may include a battery 23 and an electrical connector 38 in communication with the battery 23. As set forth further below, the electrical connector 38 may be used to charge the battery 23.

The personal mobility device 13 may include a seat post 26. For example, as shown in the Figures, the electric bicycle 24 may include the seat post 26. The seat post 26 may removably receive a seat (not shown) for supporting a driver of the personal mobility device 13, e.g., the electric bicycle 24.

The lift assembly 14 may be mounted to the vehicle 10 in any suitable manner. The lift assembly 14 may, for example, be permanently mounted to the vehicle 10 or may be removably mounted to the vehicle 10. The lift assembly 14 may be mounted to the interior 12 of the vehicle 10, as shown in the Figures. Alternatively, the lift assembly 14 may be mounted to the exterior of the vehicle 10 (not shown). In such an embodiment, for example, the lift assembly 14 may be permanently mounted to the exterior of the vehicle 10 or may be removably mounted to the exterior of the vehicle 10 with the use of cables, straps, etc.

Figure 3:
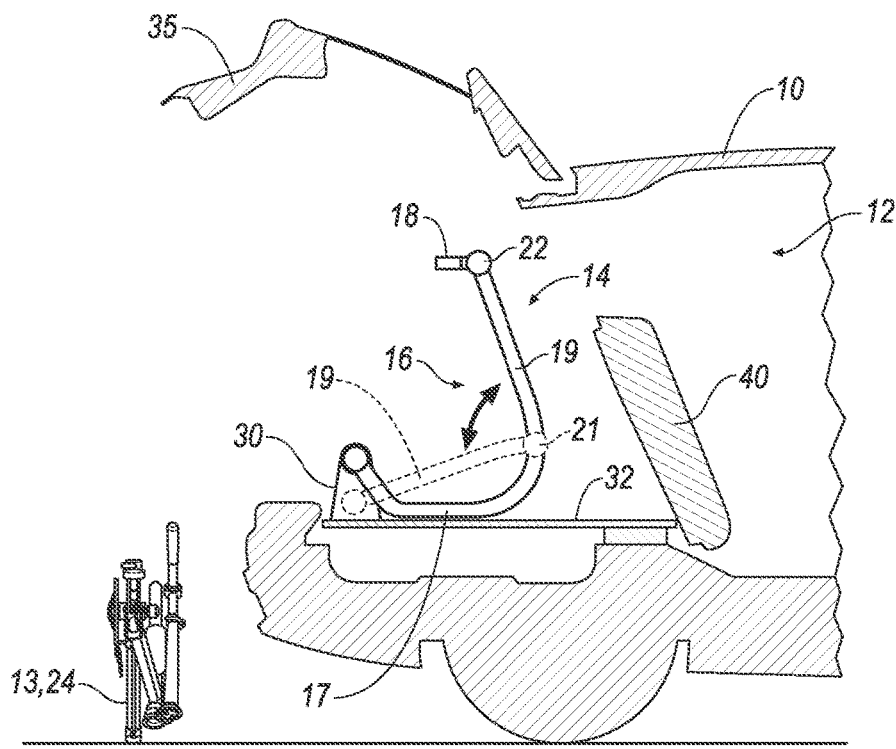
FIG. 3 is a cross-sectional view of the vehicle with the lift assembly stowed in an interior of the vehicle.
Figure 4:
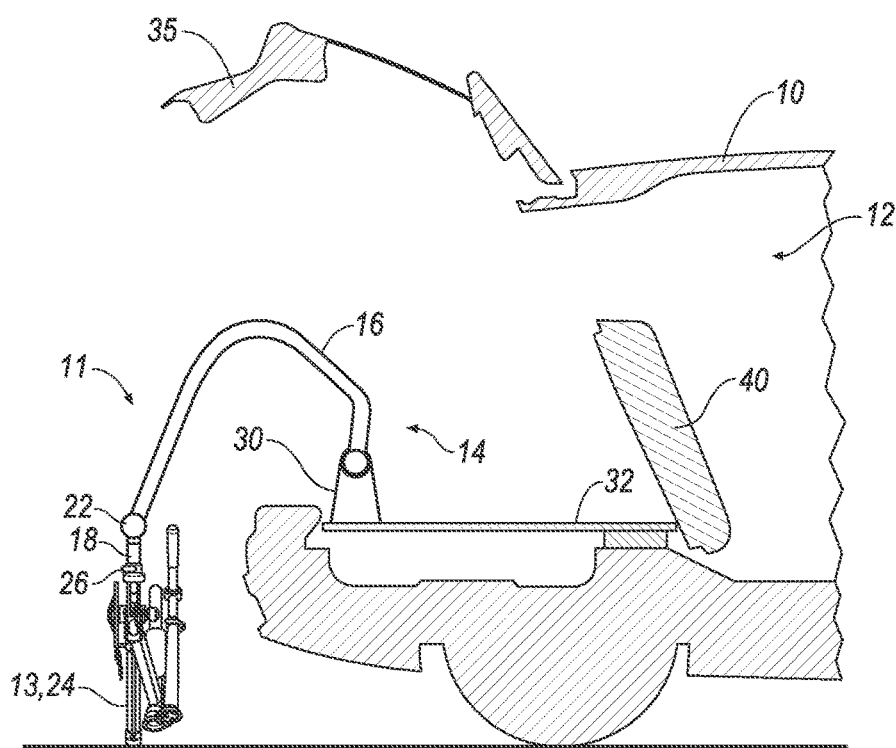
FIG. 4 is a cross-sectional view of the vehicle with the lift arm pivoted out of the interior of the vehicle to an extended position and engaging the personal mobility device in preparation for loading the device into the interior of the vehicle.

With reference to FIG. 1, the lift assembly includes a bracket 30 configured to be fixed to the vehicle 10. The bracket 30 may be fixed to any suitable component the vehicle 10 in any suitable fashion. For example, the bracket 30 is shown in FIGS. 3-4 as being mounted to a floor 32 of a rear cargo space of the vehicle 10.

Figure 2:
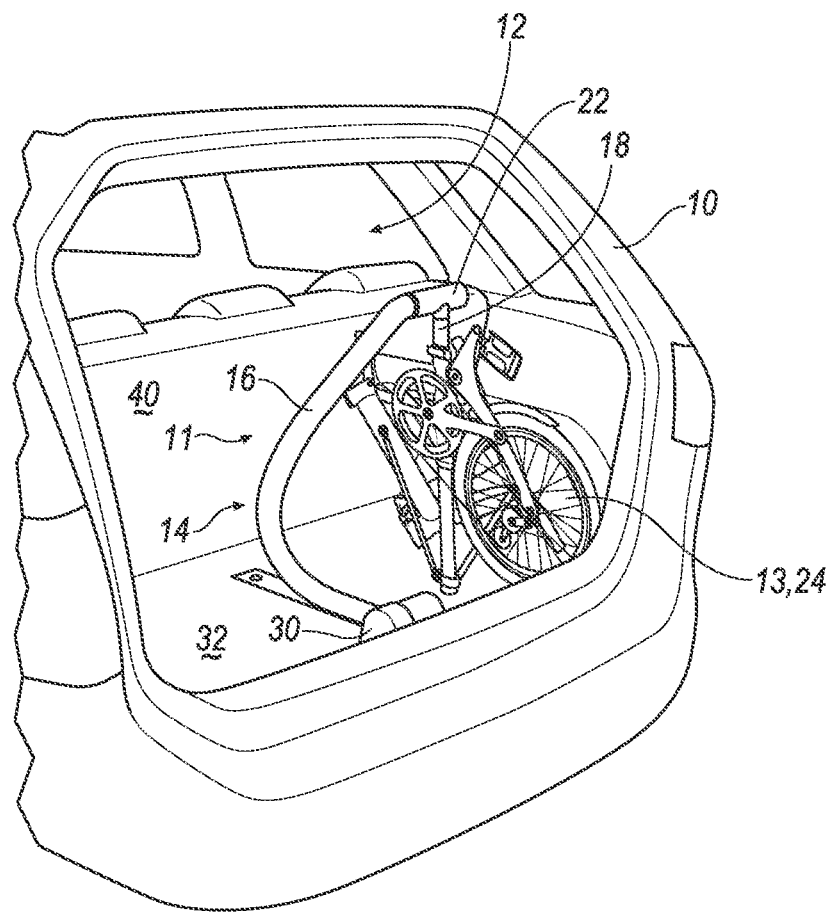
FIG. 2 is a perspective view of the personal mobility device engaged with the lift assembly in the vehicle.

The lift assembly 14 includes a lift arm 16 pivotally coupled to the vehicle 10. For example, the lift arm 16 may be pivotally coupled to the bracket 30. Specifically, the lift arm 16 may be pivotable about the bracket 30 between an extended position extending outside of the vehicle 10, as shown in FIGS. 1 and 4, and a stowed position inside the vehicle 10, as shown in FIGS. 2 and 4.

The lift arm 16 may be moved between the extended position and the stowed position in any suitable manner. The movement of the lift arm 16 may be automated. For example, a motor (not shown) may be coupled to the lift arm 16 for moving the lift arm between the extended position and the stowed position. The motor may be, for example, mounted to the vehicle 10.

In addition, or in the alternative to automated movement, the lift arm 16 may be manually moved between the extended position and the stowed position. In such a configuration, the lift arm 16 may include a spring (not shown) for assisting in movement of the lift arm 16.

Figure 6:
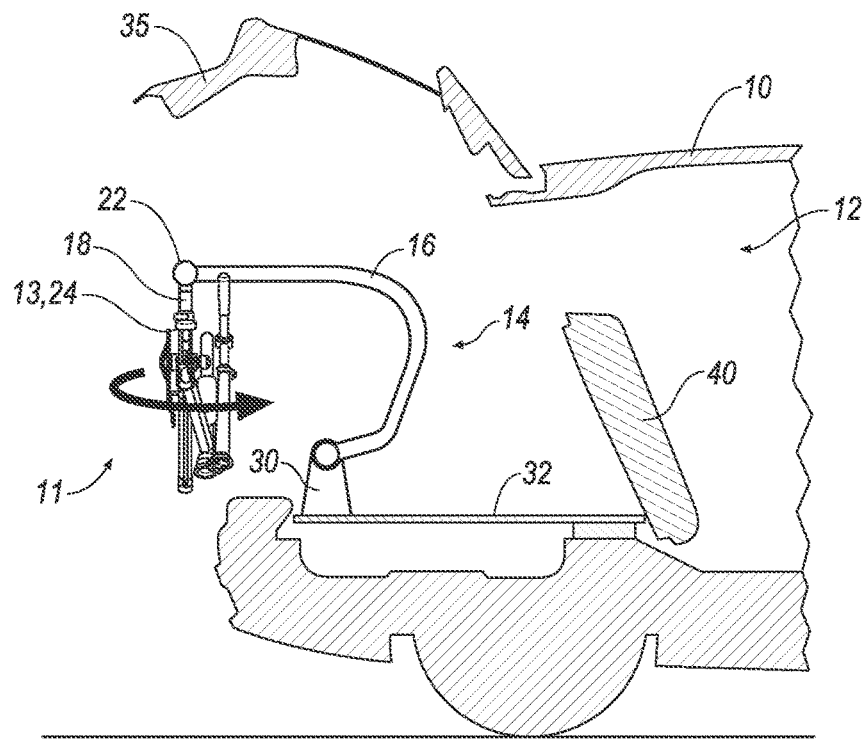
FIG. 6 is a cross-sectional view of the vehicle with the lift arm supporting the personal mobility device after initially lifting the personal mobility device.

The lift arm 16 may be operable to stop the lift arm 16 in a desired position, such as the positions shown in FIGS. 6 and/or 9, such that the personal mobility device 13 remains suspended above the ground. In such a position, the personal mobility device 13, e.g., the electric bicycle 24, may be rotated, as shown in FIG. 6, and/or folded/unfolded as shown in FIG. 9. The lift arm 16 may, for example, include a detent mechanism (not shown) for stopping the lift arm 16 in the desired position. Alternatively, or in addition, the motor coupled to the lift arm 16 may be configured to stop the lift arm 16 in the desired position.

Referring to FIG. 1, the lift arm 16 may be non-linear. The non-linear shape of the lift arm 16 allows the lift assembly 14 to be stowed within the interior 12 of the vehicle 10 without the need to fold down or remove passenger seats 40, and to rotate the electric bicycle 24 over any present vehicle lift-over/load lip. This is so even when the foldable electric bicycle 24 is also stowed in the interior 12 of the vehicle 10. The non-linear shape of the lift arm 16 helps facilitate proper mating of the lift assembly 14 with the personal mobility device 13.

In one configuration, as shown with broken lines in FIG. 3, the lift arm 16 may be folded to a compact size in the stowed position. With reference to FIG. 3, the lift arm 16 may include a first segment 17 coupled to the bracket 30 and a second segment 19 pivotally coupled to the first segment 17. Specifically, a pivot point 21 connects the first segment 17 to the second segment 19. The pivot point 21 may be of any suitable type. With reference to FIG. 3, the second segment 19 may be unfolded, as shown in solid lines, or may be folded, as shown in phantom lines. The second segment 19 may be folded, for example, when a personal mobility device 13 is not stored in the vehicle 10.

Figure 5:
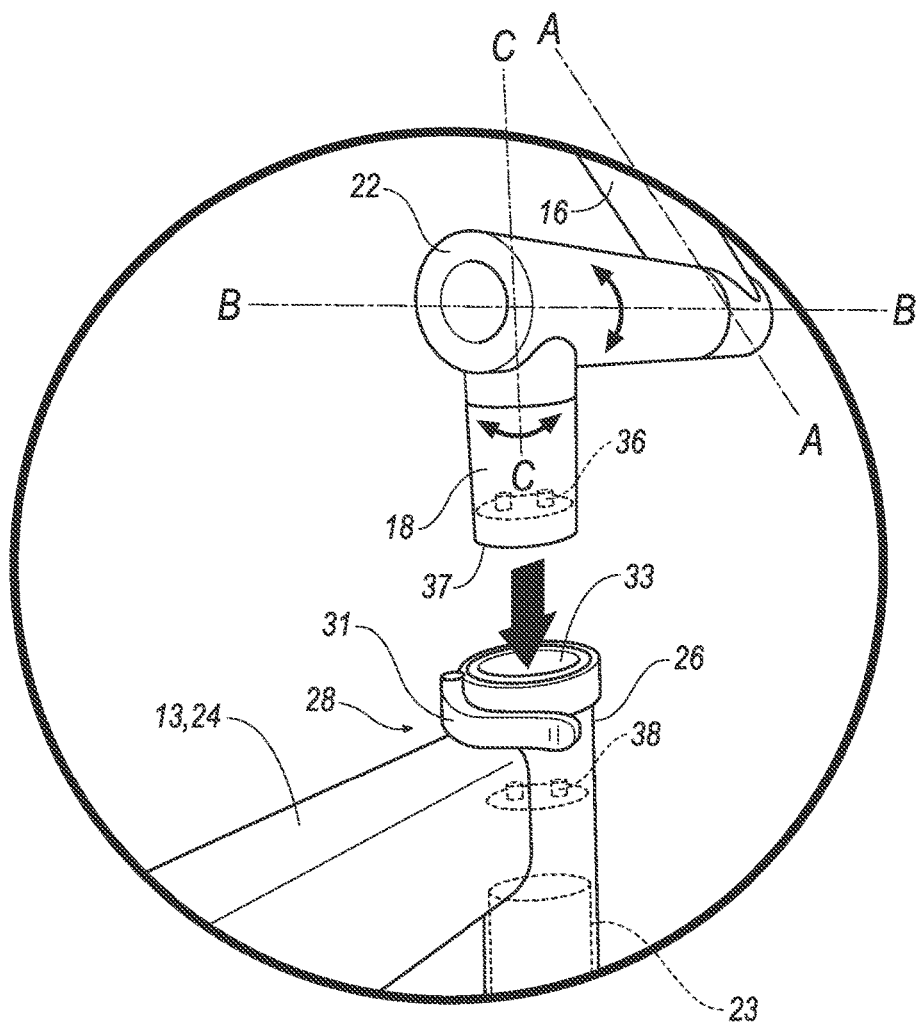
FIG. 5 is a perspective view of a mating structure of the lift arm assembly and a seat post of the personal mobility device.

The lift assembly 14 includes a mating structure 18 supported by the lift arm 16. The mating structure 18 may be configured to electrically mate with the personal mobility device 13 and may be configured to lift the personal mobility device 13. Specifically, with reference to FIG. 1, the mating structure 18 may be configured to mate to the seat post 26 of the personal mobility device 13, e.g., the electric bicycle 24. As shown in FIG. 5, for example, the seat post 26 may define a cavity 33 for receiving the mating structure 18. The mating structure 18 and the cavity 33 are sized and shaped such that the mating structure 18 may extend into the cavity 33. Alternatively, the mating structure 18 may be configured to mate with any suitable portion of the personal mobility device 13, such as a handle bar post (not numbered), etc.

With reference to FIG. 5, the personal mobility device 13 may include a lock 28 for locking to the mating structure 18 when the mating structure 18 mates with the seat post 26. The lock 28 may be, for example, a quick release lock including a clamping lever 31 rotatable relative to the seat post 26 for selectively engaging the mating structure 18. The lock 28 may be of any suitable type for locking the mating structure 18 to the personal mobility device 13. Alternatively, or in addition, the mating structure 18 may include a lock (not shown).

As best shown in FIG. 5, the mating structure 18 may include an electrical connector 36 for electrically mating the lift assembly 14. Specifically, the electrical connector 36 on the mating structure 18 mates with the electrical connector 38 of the personal mobility device 13, e.g., the electric bicycle 24. The electrical connectors 36, 38 may be of any suitable type.

The electrical connector 36 may be connected to an energy supply, such as a battery (not shown) of the vehicle 10. The mating of the electrical connector 36 of the mating structure 18 and the electrical connector 38 of the personal mobility device 13 permits charging of the battery 23 by the energy supply of the vehicle 10 through the electrical connectors 36, 38. Similarly, the electrical connectors 36, 38 may be connected to another power supply, e.g., a wall socket, for charging the battery 23.

With reference to FIG. 5, the mating structure 18 may define a cavity 37 housing the electrical connector 36, as best shown in FIG. 5. The cavity 37 may protect the electrical connector 36.

The lift arm 16 may include a plurality (not shown) of mating structures 18 that are each capable of mating with a plurality (not shown) of personal mobility device 13 such that the lift assembly 14 may lift and electrically mate to the plurality of mobility devices 13. Specifically, the lift assembly 14 can mate with any suitable number of personal mobility devices 13 to assist in loading and unloading the personal mobility devices 13 into and out of the interior 12 of the vehicle 10, as well as in stowing the devices in the interior 12 of the vehicle 10.

The lift assembly 14 may include a rotational member 22 supporting the mating structure 18 to facilitate the mating between the lift assembly 14 and the personal mobility device 13, e.g., the foldable electric bicycle 24. The rotational member 22 extends transversely to the lift arm 14. In other words, the rotational member 22 is non-parallel with the lift arm 14. As shown in the figures, the rotational member extends perpendicularly to the lift arm 14. For example, as shown in FIG. 5, the lift arm 14 extends along an axis A and the rotational member 22 extends along an axis B transverse to the axis A, for example, perpendicular to axis A as shown in FIG. 5.

The rotational member 22 is rotatable relative to the lift arm 16. The rotational member 22 may be rotatable about the axis B. The rotational member 22 may be of any suitable configuration for rotating. The rotational member 22 may rotate relative to the lift arm 16 under the force of gravity, i.e., the gravity acting on the personal mobility device 13 supported on the lift assembly 14.

The mating structure 18 extends transversely from the rotational member 22. For example, as shown in FIG. 5, the mating structure 18 extends along an axis C transverse to the axis B of the rotational member 22. The axis C may be perpendicular to axis B, as shown in FIG. 5.

The mating structure 18 is rotatable relative to the rotational member 22. The mating structure 18, for example, may rotate about the axis C. The mating structure 18 may be of any suitable configuration for rotating. The mating structure 18 may rotate relative to the rotational member 22 by manual movement, e.g., rotating the mating structure 18 by hand, and/or by automated movement, e.g., with the use of a motor (not shown).

The operation of the lift assembly 14 is shown in FIGS. 3-8. As shown in FIG. 3, lift assembly 14 may be stowed in the interior 12 of the vehicle 10 in the stowed position.

As shown in FIG. 4, the lift arm 14 may be pivoted out of the interior 12 of the vehicle 10 from the stowed position to the extended position. In the extended position, the mating structure 18 may be mated to the personal mobility device 13, e.g., the foldable electric bicycle 24, in preparation for loading it into the interior 12 of the vehicle 10, as shown in FIG. 5. Specifically, the mating structure 18 is inserted into the cavity 33. After the mating structure 18 is inserted into the cavity 33, the lock 28 may be locked to secure the personal mobility device 13, e.g., the foldable electric bicycle 24, to the lift assembly 14. FIGS. 3-5 show movement of the lift arm 14 while the foldable electric bicycle 24 is in folded. Alternatively, the foldable electric bicycle 24 may be in the position shown in FIGS. 3 and 4. In such a configuration, the mating structure 18 may be mated with the seat post 26, as shown in FIG. 5, when the foldable electric bicycle 24 is unfolded.

With reference to FIG. 6, once the mating structure 18 is mated with the personal mobility device 13, the lift arm 16 may be moved from the extended position toward the stowed position to raise the personal mobility device 13 off the ground and toward the interior 12 of the vehicle 10. As set forth above, the rotational member 22 rotates relative to the lift arm 16 as the lift arm 16 is moved toward the stowed position. The lift assembly 14 may be configured to prevent lateral movement of the personal mobility device 13, i.e., to prevent cross-vehicle movement. For example, the bracket 30, lift arm 16, rotational member 22, and mating structure 18 may each be configured to prevent lateral movement of the personal mobility device 13 when the personal mobility device 13 is mated with the lift assembly 14.

Figure 7:
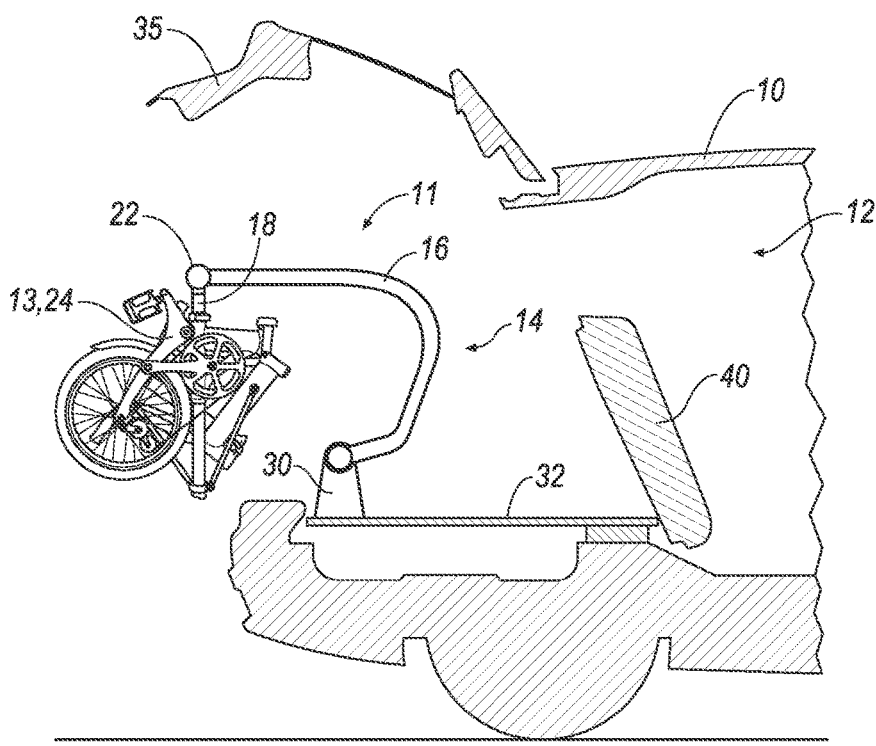
FIG. 7 is a cross-sectional view of the vehicle with the lift arm supporting the personal mobility device after the device has been rotated relative to the vehicle.

With reference to FIGS. 6 and 7, the personal mobility device 13 may be rotated relative to the vehicle 10 while suspended by the lift arm 16 to, for example, better fit in the interior 12 of the vehicle. Specifically, for example, the mating structure 18 may rotate relative to the rotational member 22, as set forth above. The lift arm 16 may be operable to stop in the desired position shown in FIGS. 6 and 7 to allow the mating structure 18 to be rotated relative to the rotational member 22, as set forth above.

Figure 8:
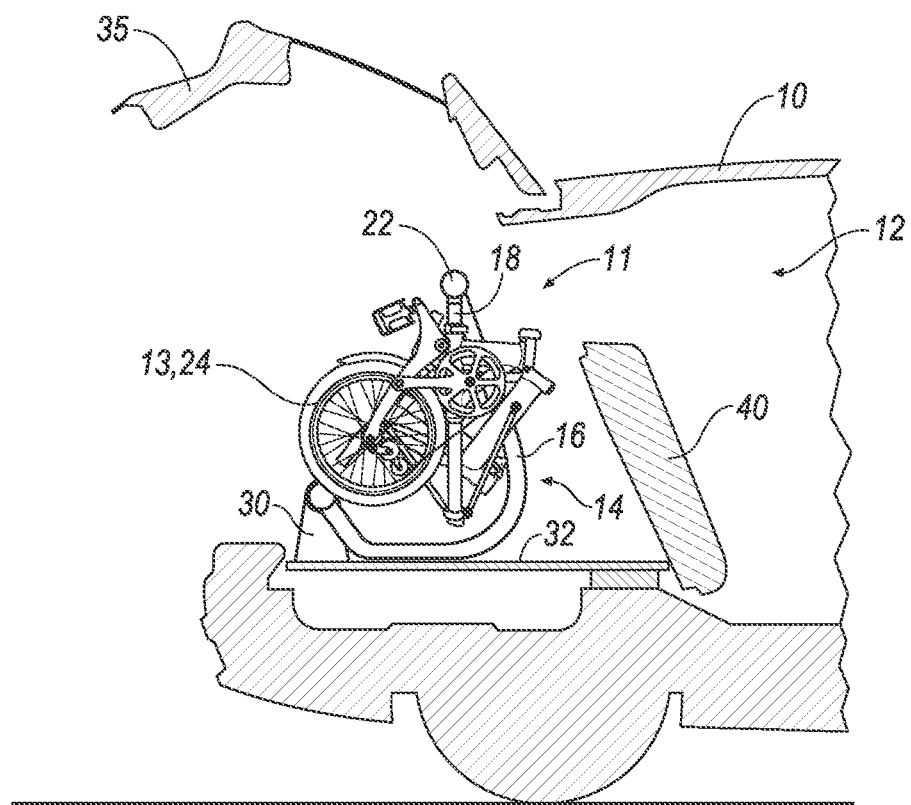
FIG. 8 is a cross-sectional view of the vehicle with the lift arm engaged with the personal mobility device and in a stowed position after the personal mobility device is loaded in the interior of the vehicle.

With reference to FIG. 8, the lift arm 16 is moved to the stowed position to stow the personal mobility device 13 in the interior 12 of the vehicle 10. When the personal mobility device 13 is stowed, a rear hatch 35 of the vehicle 10 may be closed (not shown).

As set forth above, when the mating structure 18 is mated with the personal mobility device 13, the electrical connector 36 on the mating structure 18 connects with the electrical connector 38 on the personal mobility device 13 to allow for charging of the battery 23 of the personal mobility device 13 with the power source of the vehicle 10. Specifically, the battery 23 may be charged by the power source through the electrical connectors 36, 38 when the personal mobility device 13 is stowed in the vehicle 10.

With reference to FIG. 9, the personal mobility vehicle 13, e.g., the electric bicycle 24 that is foldable, may be suspended to reconfigure the personal mobility vehicle 13. For example, with the electric bicycle 24 that is foldable, as shown in FIG. 9, the electric bicycle may be folded and/or unfolded when the electric bicycle 24 is suspended. By suspending the electric bicycle 24, the lift arm 16 supports the weight of the electric bicycle 24, which simplifies the folding/unfolding of the electric bicycle 24.

The disclosure has been described in an illustrative manner, and it is to be understood that the terminology that has been used is intended to be in the nature of words of description rather than limitation. Many modifications and variations of the present disclosure are possible in light of the above teachings, and the invention may be practiced otherwise than as specifically described.

What is claimed is:

1. A lift assembly for a vehicle, the lift assembly comprising:
a bracket configured to be fixed to the vehicle;
a lift arm pivotally coupled to the bracket; and
a mating structure supported by the lift arm and configured to lift a personal mobility device, the mating structure including an electrical connector for electrically mating to an electrical connector of the personal mobility device.

2. The lift assembly as set forth in claim 1 further comprising a rotational member extending transversely to the lift arm, the rotational member being rotatable relative to the lift arm.

3. The lift assembly as set forth in claim 2 wherein the mating structure extends transversely from the rotational member and is rotatable relative to the rotational member.

4. The lift assembly as set forth in claim 3 wherein the rotational member supports the mating structure.

5. The lift assembly as set forth in claim 4 wherein the mating structure defines a cavity housing the electrical connector.

6. The lift assembly for the vehicle of claim 2, wherein the lift arm has a first segment coupled to the bracket, a second segment coupled to the mating structure, and a pivot point between the first segment and the second segment for folding the lift arm.

7. The lift assembly for the vehicle of claim 1, wherein the lift arm is non-linear.

8. A personal mobility system for a vehicle, the system comprising:
a personal mobility device including a battery and an electrical connector in communication with the battery;
a lift arm configured to pivotally couple to the vehicle; and
a mating structure supported by the lift arm;
the mating structure being configured to lift the personal mobility device and including an electrical connector for electrically mating to the electrical connector of the personal mobility device.

9. The personal mobility system as set forth in claim 8 wherein the personal mobility device is an electric bicycle.

10. The personal mobility system as set forth in claim 9 wherein the electric bicycle is foldable.

11. The personal mobility system as set forth in claim 8 wherein the personal mobility device includes a seat post configured to receive the mating structure.

12. The personal mobility system as set forth in claim 11 wherein the seat post supports the electrical connector of the personal mobility device.

13. The personal mobility system as set forth in claim 11 wherein the seat post includes a lock for locking to the mating structure.

14. The personal mobility system as set forth in claim 8 further comprising a rotational member extending transversely to the lift arm, the rotational member being rotatable relative to the lift arm.

15. The personal mobility system as set forth in claim 14 wherein the mating structure extends transversely from the rotational member and is rotatable relative to the rotational member.

16. The personal mobility system as set forth in claim 15 wherein the rotational member supports the mating structure.

17. The personal mobility system as set forth in claim 16 wherein the mating structure defines a cavity housing the electrical connector of the mating structure.

18. The personal mobility system for the vehicle of claim 14, wherein the lift arm has a first segment for being coupled to the vehicle, a second segment coupled to the mating structure, and a pivot point between the first segment and the second segment for folding the lift arm.

19. The personal mobility system for the vehicle of claim 8, wherein the lift arm is non-linear.

\* \* \* \* \*